United States Patent
Codilian et al.

(10) Patent No.: US 6,968,422 B1
(45) Date of Patent: Nov. 22, 2005

(54) DISK DRIVE EMPLOYING A MODIFIED ROTATIONAL POSITION OPTIMIZATION ALGORITHM TO ACCOUNT FOR EXTERNAL VIBRATIONS

(75) Inventors: Raffi Codilian, Irvine, CA (US); Mark F. Vallis, Rancho Santa Margarita, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 334 days.

(21) Appl. No.: 10/609,241

(22) Filed: Jun. 27, 2003

(51) Int. Cl.[7] .......................... G06F 12/00; G11B 5/48
(52) U.S. Cl. .................. 711/112; 711/100; 711/154; 360/99.08
(58) Field of Search .................. 711/100, 112, 154; 360/75, 78.07, 86, 99.08, 110, 47.36

(56) References Cited

U.S. PATENT DOCUMENTS

| | | | |
|---|---|---|---|
| 5,268,804 A | 12/1993 | Wallis | |
| 5,570,332 A | 10/1996 | Heath et al. | |
| 5,991,825 A | 11/1999 | Ng | |
| 6,418,510 B1 * | 7/2002 | Lamberts | 711/113 |
| 6,711,628 B1 * | 3/2004 | Thelin | 710/6 |
| 6,721,906 B1 * | 4/2004 | Hirashita et al. | 714/54 |
| 6,842,801 B2 * | 1/2005 | Yamada | 710/56 |
| 6,845,405 B1 * | 1/2005 | Thelin | 710/6 |
| 2002/0059476 A1 * | 5/2002 | Yamada | 710/1 |

* cited by examiner

Primary Examiner—Tuan V. Thai
(74) Attorney, Agent, or Firm—Howard H. Sheerin, Esq.

(57) ABSTRACT

A disk drive is disclosed which executes a rotational position optimization (RPO) algorithm to select a next command to execute from a command queue relative to an estimated access time. If an external vibration is detected, the RPO algorithm increases at least one of an estimated seek latency, an estimated settle latency, and an estimated rotational latency for each command in the command queue.

42 Claims, 12 Drawing Sheets

DISK DRIVE EMPLOYING A MODIFIED ROTATIONAL POSITION OPTIMIZATION ALGORITHM TO ACCOUNT FOR EXTERNAL VIBRATIONS

BACKGROUND OF THE INVENTION

1. Field of the Invention

The present invention relates to disk drives for computer systems. More particularly, the present invention relates to a disk drive employing a modified rotational position optimization (RPO) algorithm to account for external vibrations.

2. Description of the Prior Art

Rotational position optimization (RPO) algorithms improve the access performance of disk drives by minimizing the seek and settle latency of the head and the rotational latency of the disk. This is illustrated in FIG. 1 which shows a disk drive executing a current command with two commands (COMMAND 1 and COMMAND 2) staged in a command queue. While executing the current command the disk drive will execute an RPO algorithm to select the next command from the command queue having the least access time. In the example of FIG. 1, the disk drive calculates the seek, settle, and rotational latencies in terms of the number of servo wedges and selects the command that can be accessed in the minimal number of servo wedges. The number of servo wedges is calculated from a reference cylinder/head/wedge or REF_CHW (which is typically the last sector in the current command) to the first CHW corresponding to the first sector of each command in the command queue. Accessing COMMAND 1 in FIG. 1 requires 1 servo wedge in seek latency, 2 servo wedges in settle latency, and 3 servo wedges in rotational latency, whereas accessing COMMAND 2 in FIG. 1 requires 2 servo wedges in seek latency, 2 servo wedges in settle latency, and 1 servo wedges in rotational latency. The disk drive will therefore select COMMAND 2 as the next command to execute since COMMAND 2 has an access time of 5 servo wedges whereas COMMAND 1 has an access time of 6 servo wedges.

The settle latencies are typically estimated under nominal operating conditions and stored in a table for use by the RPO algorithm. However, these estimated settle latencies may be unreliable if the disk drive is subject to an external vibration during normal operation, such as another mechanical device perturbing the disk drive, which can propagate through to the actuator arm and increase the actual settle latency. This is illustrated in FIG. 2 wherein the settle latency for accessing COMMAND 2 has increased to 4 servo wedges due to an external vibration perturbing the actuator arm. Under this condition the start of COMMAND 2 is missed causing the disk drive to wait a revolution to execute the command, or causing the disk drive to utilize the RPO algorithm to select another command to be executed. In either case the performance degrades since the RPO algorithm does not initially select the optimal command to execute due to the external vibration increasing the actual settle latency.

There is, therefore, a need to improve the RPO algorithm in a disk drive by accounting for external vibrations increasing the actual settle latency.

SUMMARY OF THE INVENTION

The present invention may be regarded as a disk drive comprising a disk having a plurality of tracks, a head actuated radially over the disk, a command queue for storing a plurality of commands pending execution, and a disk controller for executing a rotational position optimization (RPO) algorithm to select a next command to execute from the command queue relative to an estimated access time. The estimated access time comprises an estimated seek latency required to move the head radially over the disk to a target track comprising the next command, an estimated settle latency required for the head to settle over the target track, wherein the settle latency occurs after the seek latency, and an estimated rotational latency required for the disk to rotate until the head reaches the next command, wherein the rotational latency occurs after the settle latency. The RPO algorithm increases at least one of the estimated seek latency, the estimated settle latency, and the estimated rotational latency for each command in the command queue if an external vibration is detected.

In one embodiment, the next command is a read command, and in another embodiment the next command is a write command.

In another embodiment, the disk drive comprises an accelerometer for detecting the external vibration. In yet another embodiment, the external vibration is detected from a position error signal generated by reading embedded servo sectors recorded on the disk. In still another embodiment, the external vibration is detected if a number of missed commands out of a number of attempted commands exceeds a predetermined threshold. In another embodiment, the disk drive further comprises a voice coil motor for actuating the head radially over the disk, wherein the external vibration is detected from a back EMF voltage generated by the voice coil motor.

In one embodiment, the RPO algorithm increases estimated settle latency if the external vibration is detected. In one embodiment, the estimated access time comprises an estimated seek latency value, an estimated settle latency value, and an estimated rotational latency value, wherein an offset is added to the estimated settle latency value if the external vibration is detected. In yet another embodiment, the estimated access time comprises an estimated seek latency value including the estimated settle latency, and an estimated rotational latency value, wherein an offset is added to the estimated seek latency value if the external vibration is detected.

In one embodiment, the estimated access time is computed from a reference position on the disk to a beginning of each command in the command queue, wherein the reference position is adjusted by an offset if the external vibration is detected. In one embodiment, the estimated access time comprises an estimated seek latency value and an estimated rotational latency value, the estimated rotational latency value includes the estimated settle latency, and adjusting the reference position by the offset increases the estimated settle latency.

In another embodiment, at least one of the estimated seek latency, the estimated settle latency, and the estimated rotational latency is increased in response to a magnitude of the detected external vibration.

In still another embodiment, the RPO algorithm increases the estimated seek latency if the external vibration is detected. In one embodiment, the RPO algorithm computes the estimated seek latency from a first seek profile if the external vibration is not detected, and from a second seek profile if the external vibration is detected.

In another embodiment, the RPO algorithm increases the estimated rotational latency if the external vibration is detected. In one embodiment, the RPO algorithm increases the estimated rotational latency by a partial revolution of the disk for at least one command in the command queue if the external vibration is detected.

In yet another embodiment, a read estimated access time is computed for read commands in the command queue and a write estimated access time is computed for write commands in the command queue, wherein the read estimated access time is shorter than the write estimated access time.

The present invention may also be regarded as a method of operating a disk drive, the disk drive comprising a disk having a plurality of tracks, a head actuated radially over the disk, and a command queue for storing a plurality of commands pending execution. A RPO algorithm is executed to select a next command to execute from the command queue relative to an estimated access time. The estimated access time comprises an estimated seek latency required to move the head radially over the disk to a target track comprising the next command, an estimated settle latency required for the head to settle over the target track, wherein the settle latency occurs after the seek latency, and an estimated rotational latency required for the disk to rotate until the head reaches the next command, wherein the rotational latency occurs after the settle latency. If an external vibration is detected, the RPO algorithm increases at least one of the estimated seek latency, the estimated settle latency, and the estimated rotational latency for each command in the command queue.

DESCRIPTION OF THE PREFERRED EMBODIMENTS

Figure 3A:
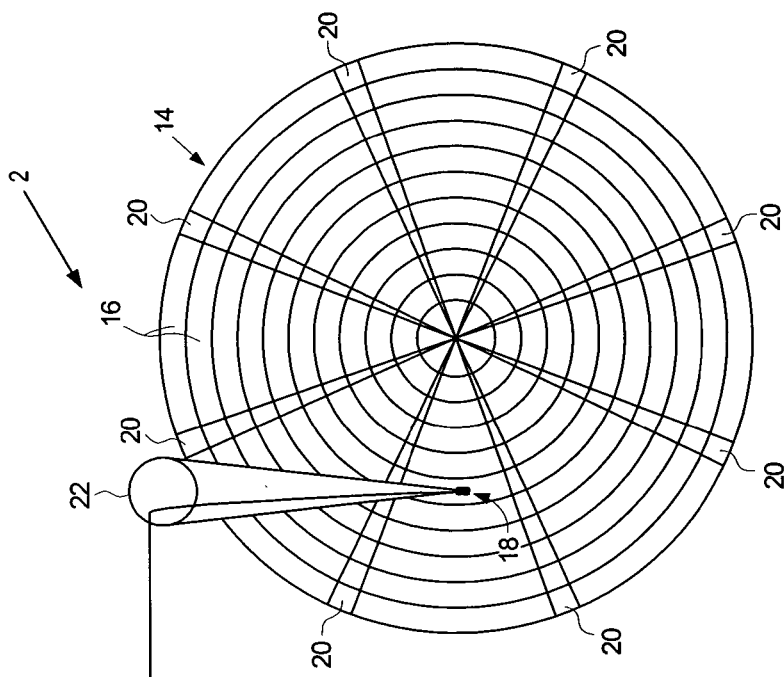
FIGS. 3A and 3B show a disk drive according to an embodiment of the present invention which executes a modified RPO algorithm if an external vibration is detected.
Figure 3B:
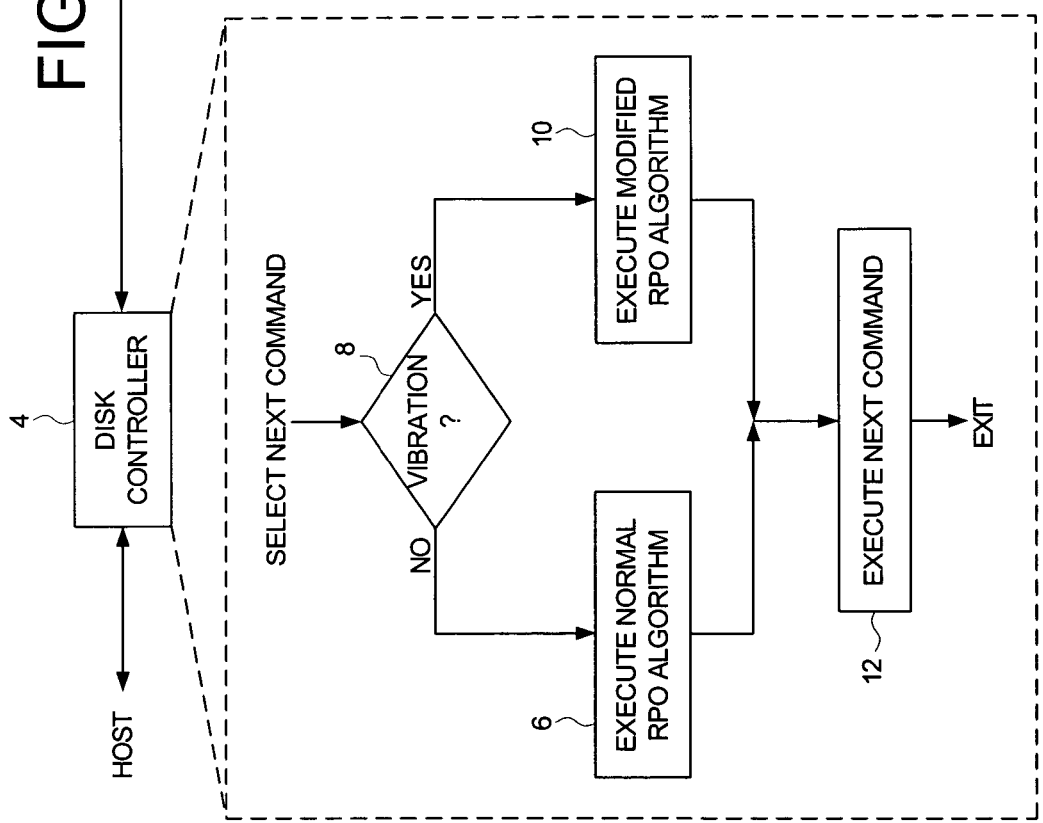

FIG. 3A shows a disk drive 2 according to an embodiment of the present invention comprising a disk controller 4 for executing a rotational position optimization (RPO) algorithm to select a next command to execute from a command queue. As shown in the flow diagram of FIG. 3B, at step 6 the disk controller 4 executes a normal RPO algorithm if an external vibration is not detected at step 8, and at step 10 executes a modified RPO algorithm if an external vibration is detected at step 8. The next command selected by the RPO algorithm is then executed at step 12.

The disk drive 2 of FIG. 3A comprises a disk 14 having a plurality of tracks 16, a head 18 actuated radially over the disk 14, a command queue for storing a plurality of commands pending execution, and the disk controller 4 for executing the rotational RPO algorithm relative to an estimated access time required to access each command in the command queue. The estimated access time comprises an estimated seek latency required to move the head radially over the disk 14 to a target track comprising the next command, an estimated settle latency required for the head to settle over the target track, wherein the settle latency occurs after the seek latency, and an estimated rotational latency required for the disk to rotate until the head reaches the next command, wherein the rotational latency occurs after the settle latency. The RPO algorithm increases at least one of the estimated seek latency, the estimated settle latency, and the estimated rotational latency for each command in the command queue if an external vibration is detected.

Figure 2:
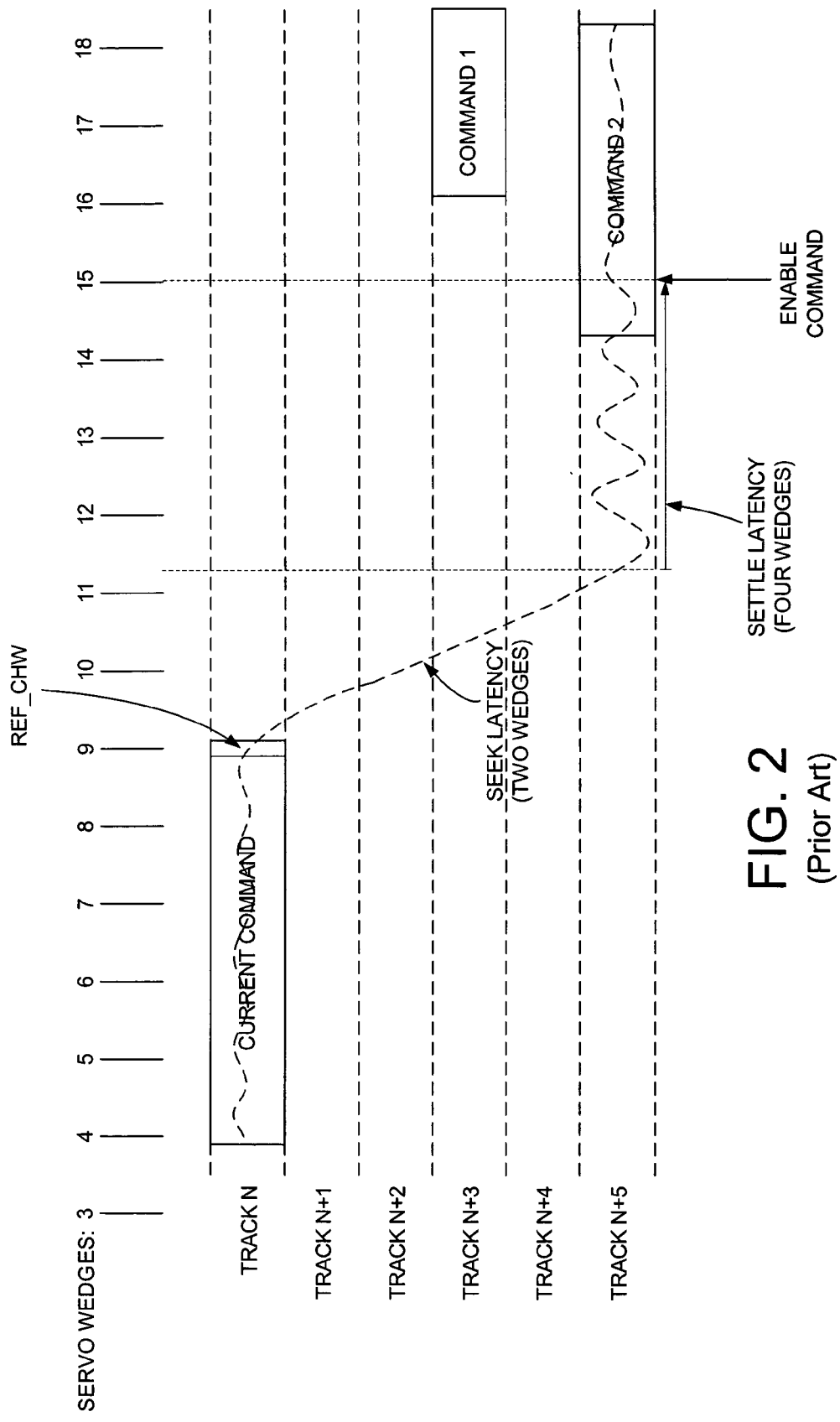
FIG. 2 illustrates how an external vibration can increase the actual settle latency causing the next command selected by the prior art RPO algorithm to be missed.

The external vibration may be detected using any suitable technique. For example, in one embodiment, the disk drive 2 comprises an accelerometer for detecting the external vibration. In another embodiment, the external vibration is detected from a position error signal generated by reading embedded servo sectors 20 (FIG. 3A) recorded on the disk 14. In still another embodiment, the external vibration is detected if a number of missed commands out of a number of attempted commands exceeds a predetermined threshold. A command is "missed" if after the actual settle latency the beginning of the next command is missed requiring an additional partial revolution of latency for the head to reach the beginning of the next command (as described above with reference to FIG. 2). An external vibration will increase the frequency of missed commands and therefore an external vibration may be detected if the frequency of missed commands exceeds a threshold. In another embodiment, the disk drive 2 further comprises a voice coil motor 22 (FIG. 3A) for actuating the head 18 radially over the disk 14, wherein an external vibration is detected from a back EMF voltage generated by the voice coil motor 22.

Figure 4:
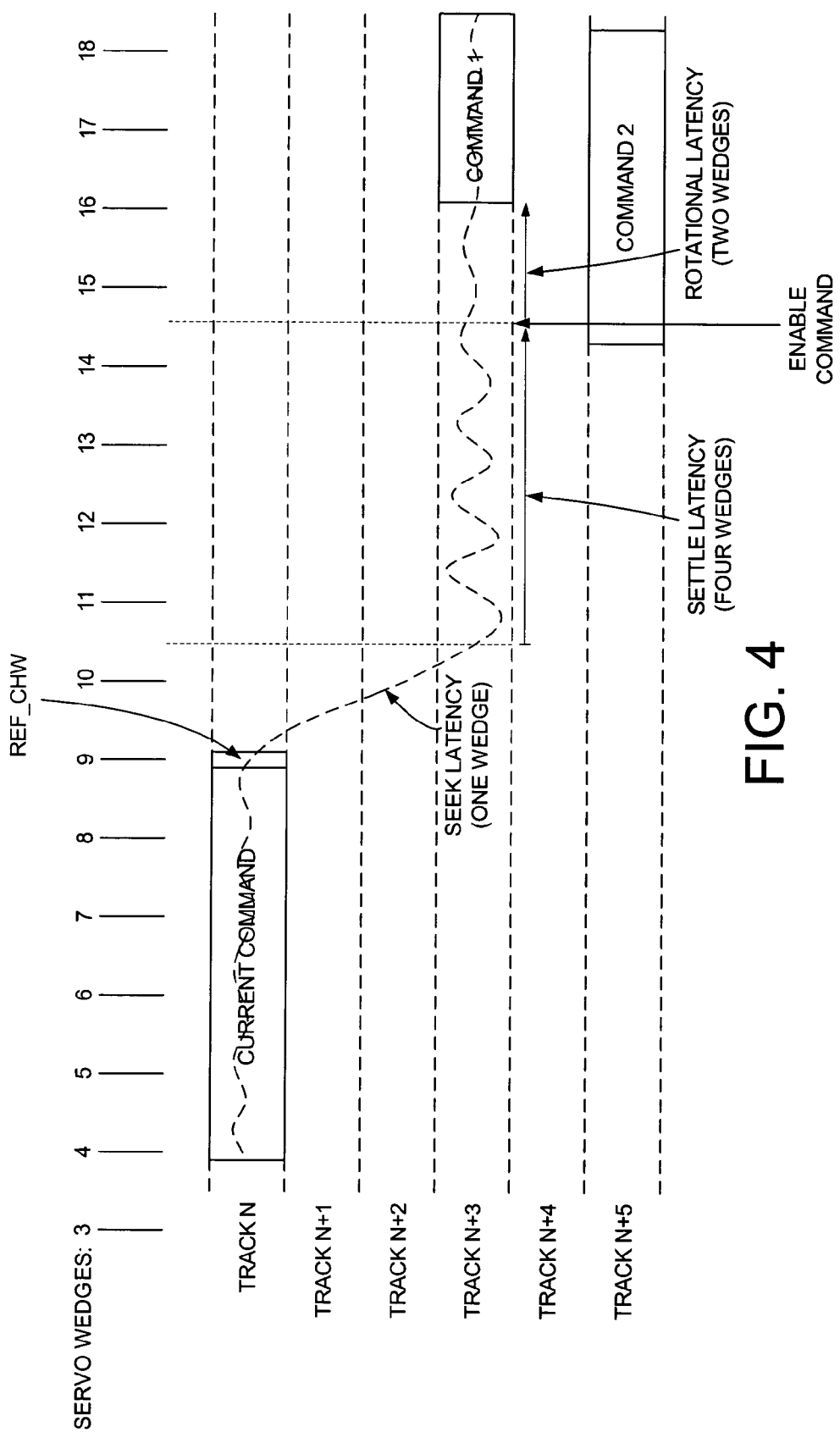
FIG. 4 illustrates how increasing the estimated settle latency in the presence of an external vibration causes the RPO algorithm to select a more optimal command to execute.

The effect of increasing the estimated settle latency if an external vibration is detected is illustrated in FIG. 4. The external vibration increases the actual settle latency such that COMMAND 2 would be missed (adding a partial revolution of rotational latency) if selected by the RPO algorithm as the next command to execute. By increasing the estimated settle latency the RPO algorithm increases the rotational latency for COMMAND 2 by a partial revolution, and therefore determines that COMMAND 1 should be the next command selected to execute since the actual settle latency ends prior to the head reaching COMMAND 1.

Although the RPO algorithm operates relative to an estimated seek, settle, and rotational latency, these latencies may be represented in any suitable manner. In one embodiment, the estimated access time comprises three separate values representing the estimated seek, settle, and rotational latencies, wherein an offset is added to the estimated settle latency value if an external vibration is detected. In yet another embodiment, the estimated access time comprises an estimated seek latency value including the estimated settle latency, and an estimated rotational latency value, wherein an offset is added to the estimated seek latency value if the external vibration is detected. In still another embodiment, the estimated access time comprises a single value representing the estimated seek, settle and rotational latencies, wherein a table stores a normal estimated access time and a vibration estimated access time corresponding to each command in the command queue. In yet another embodiment described below with reference to FIG. 8, the estimated access time is computed from a reference position on the disk to a beginning of each command in the command queue, wherein the reference position is adjusted by an offset if the external vibration is detected in order to increase the estimated settle latency.

Figure 1:
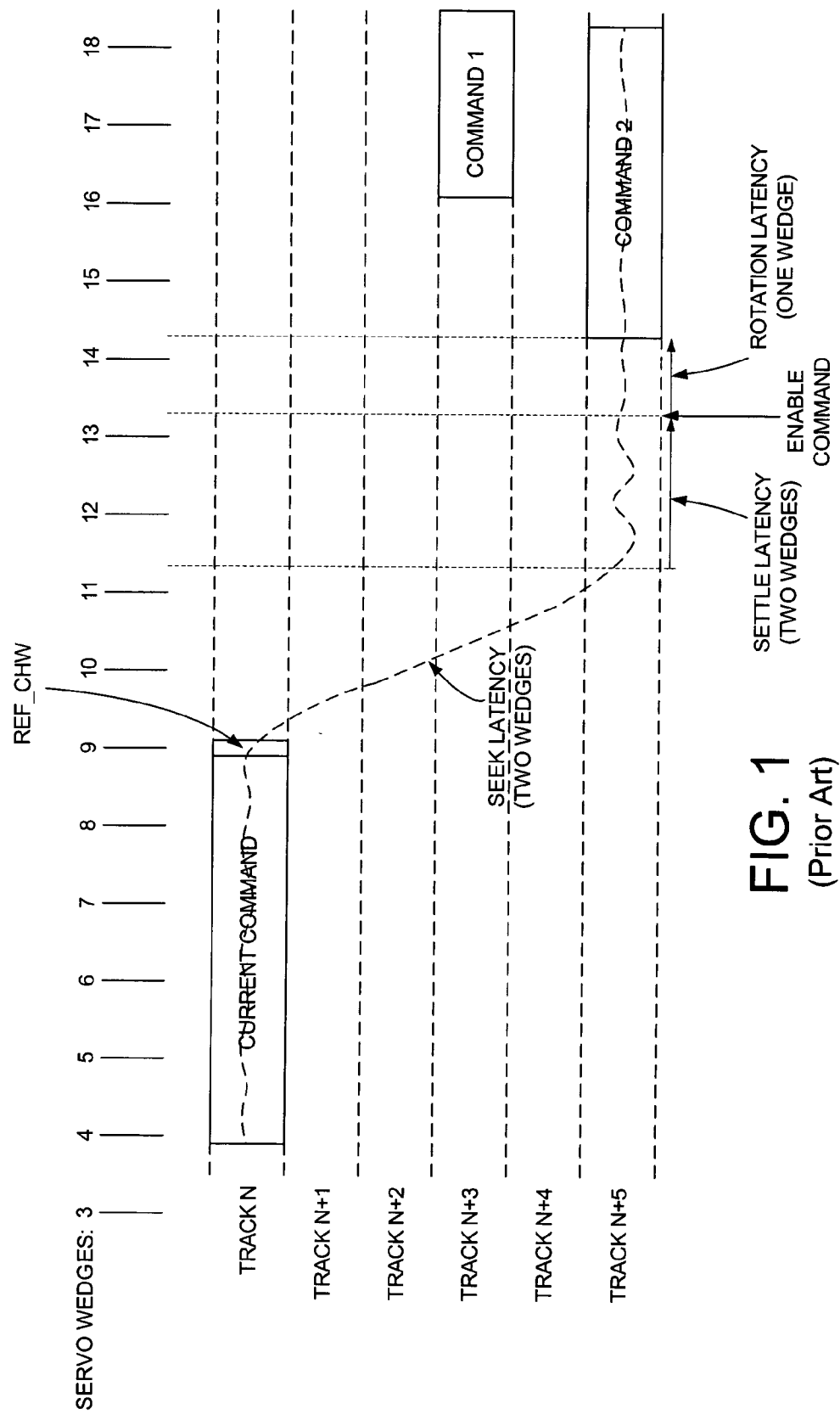
FIG. 1 shows a prior art RPO algorithm selecting a next command to execute by computing an estimated seek, settle, and rotational latency without accounting for an external vibration increasing the actual settle latency.
Figure 5:
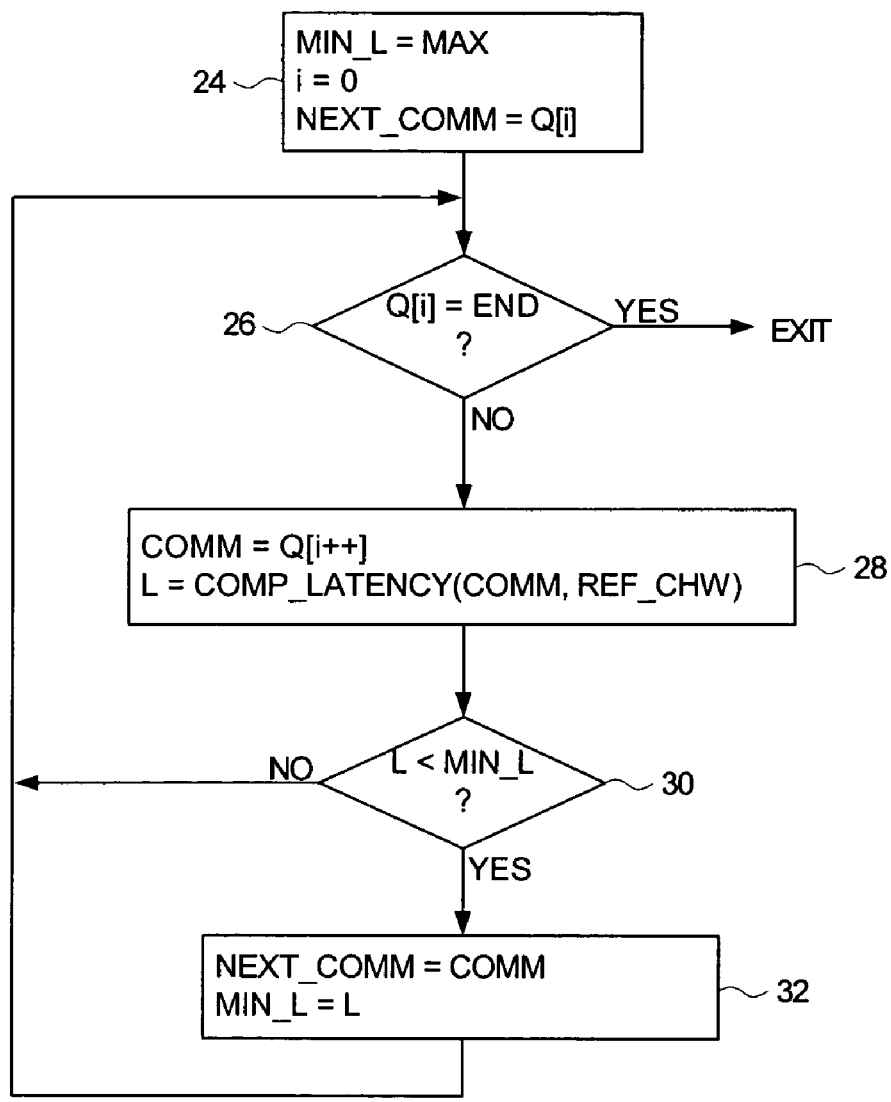
FIG. 5 shows a flow diagram of a prior art RPO algorithm which computes the estimated access times for each command in a command queue without accounting for an increase in the actual settle latency caused by an external vibration.

FIG. 5 shows a flow diagram for executing a conventional RPO algorithm. At step 24 a minimum access time variable MIN_L is initialized to a maximum value, an index i is initialized to zero, and a next command variable NEXT_COMM is initialized to a first command in a command queue Q[i]. If at step 26 there are no commands in the command queue, then the RPO algorithm exits. Otherwise at step 28 a command variable COMM is assigned the command in the command queue Q[i++] and an estimated access time L (comprising an estimated seek latency, an estimated settle latency, and an estimated rotational latency) is computed for the COMM relative to a reference cylinder/head/wedge REF_CHW (as described above with reference to FIG. 1). If at step 30 the estimated access time L is less than the current minimum access time MIN_L, then at step 32 the NEXT_COMM is assigned to the COMM and the MIN_L is assigned to the estimated access time L computed for the COMM. The process is then repeated starting at step 26 until an estimated access time has been computed for each command in the command queue and NEXT_COMM is assigned the next command to execute.

Figure 6:
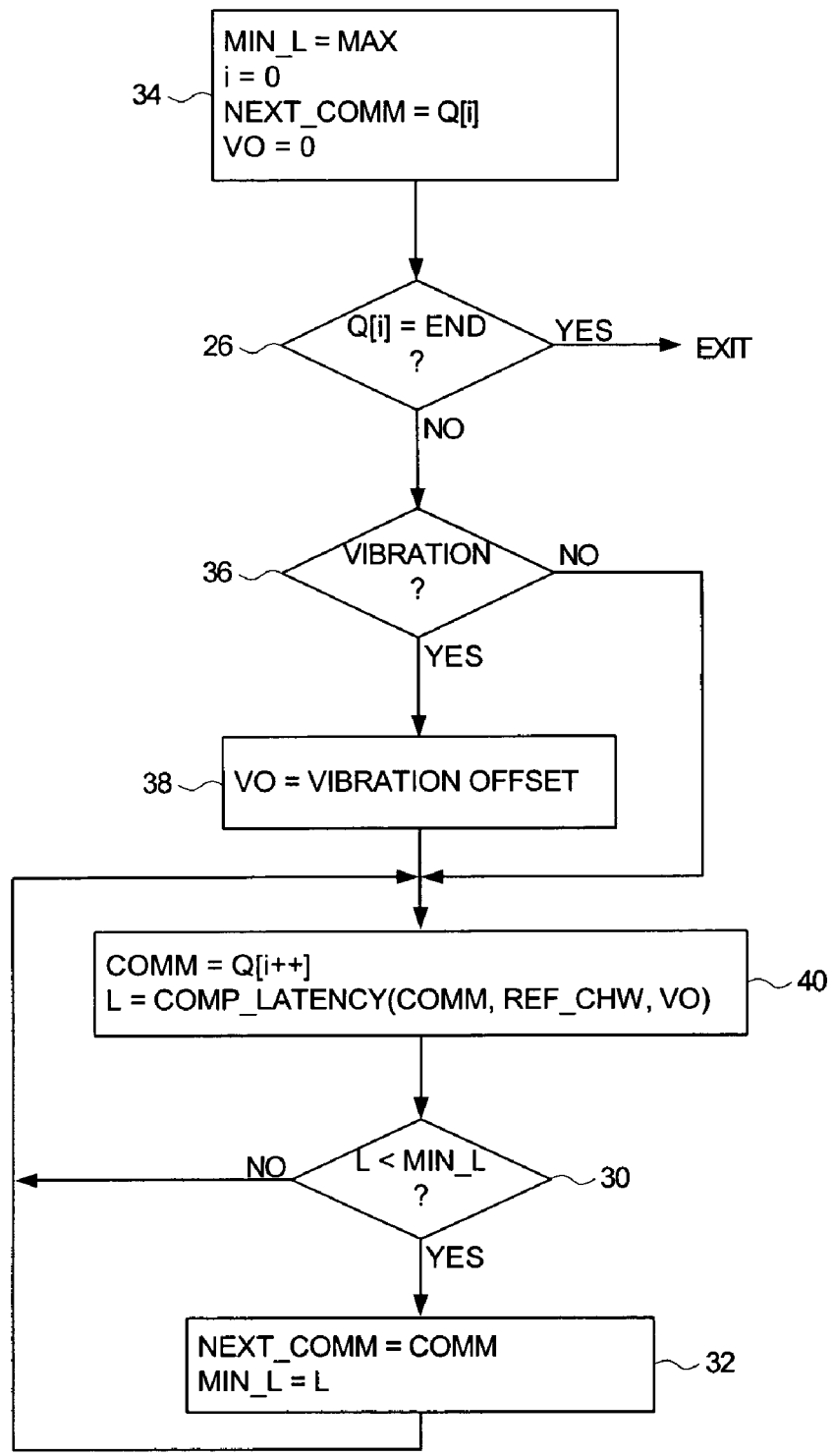
FIG. 6 shows a flow diagram according to an embodiment of the present invention which computes the estimated access times for each command in the command queue using a vibration offset value which compensates for the increase in the actual settle latency caused by an external vibration.

FIG. 6 is a flow diagram according to an embodiment of the present invention illustrating how the flow diagram of FIG. 5 could be modified to account for an external vibration. At step 34 a vibration offset variable VO is initialized to zero. If at step 36 an external vibration is detected, then at step 38 the VO is assigned an offset VIBRATION OFFSET. At step 40 the VO is used to increase at least one of the estimated seek latency, the estimated settle latency, and the estimated rotational latency when computing the estimated access time L for the COMM.

Figure 7:
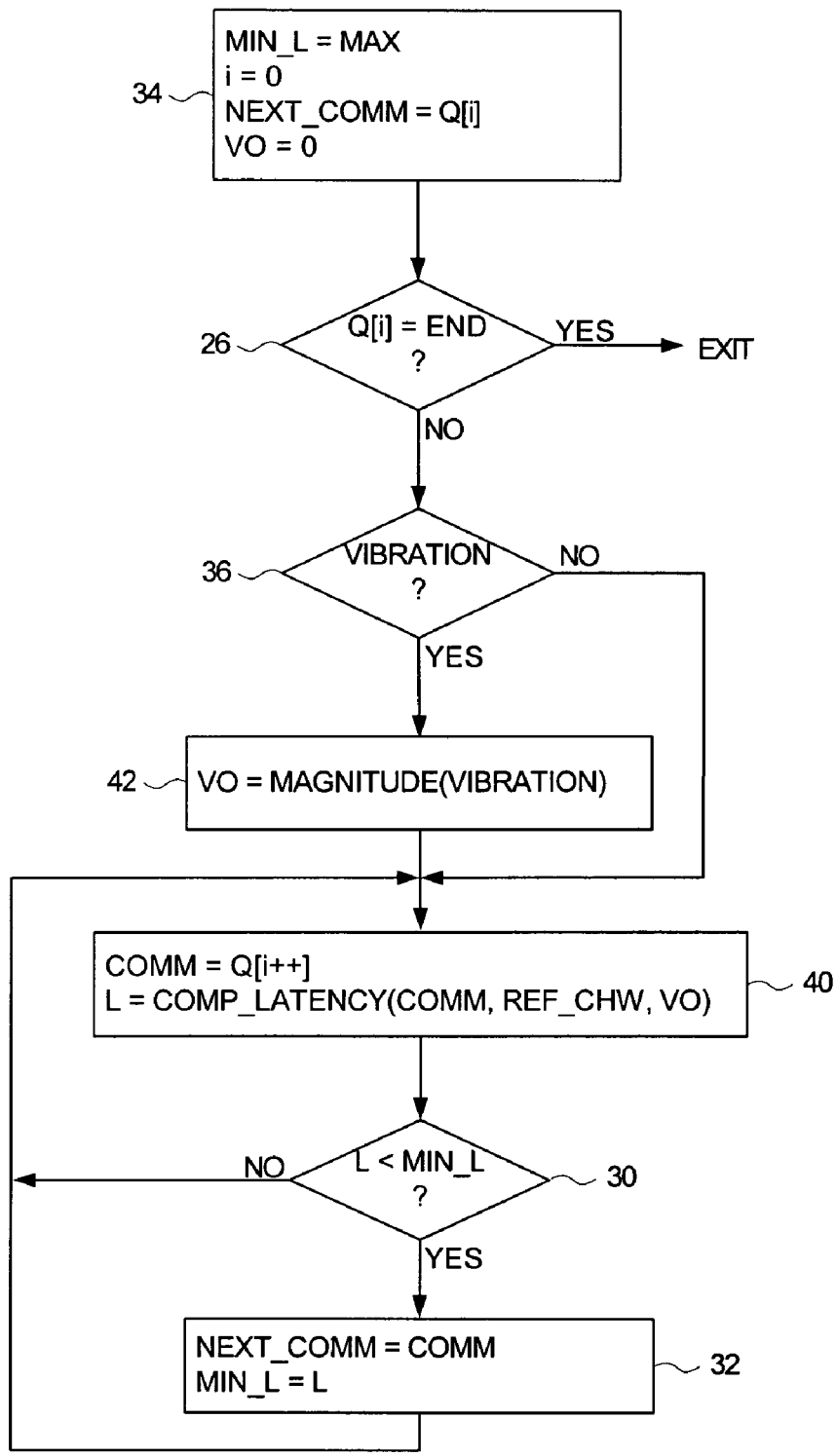
FIG. 7 shows a flow diagram according to an embodiment of the present invention wherein the vibration offset is computed as a function of the magnitude of the external vibration.

FIG. 7 is a flow diagram according to an alternative embodiment of the present invention wherein at step 42 the vibration offset value assigned to VO is generated in response to a magnitude of the detected external vibration. Assigning an offset to VO proportional to the magnitude of the detected external vibration helps optimize the RPO algorithm by better matching the estimated settle latency to the actual settle latency since the actual settle latency increases as the magnitude of the external vibration increases.

Figure 8:
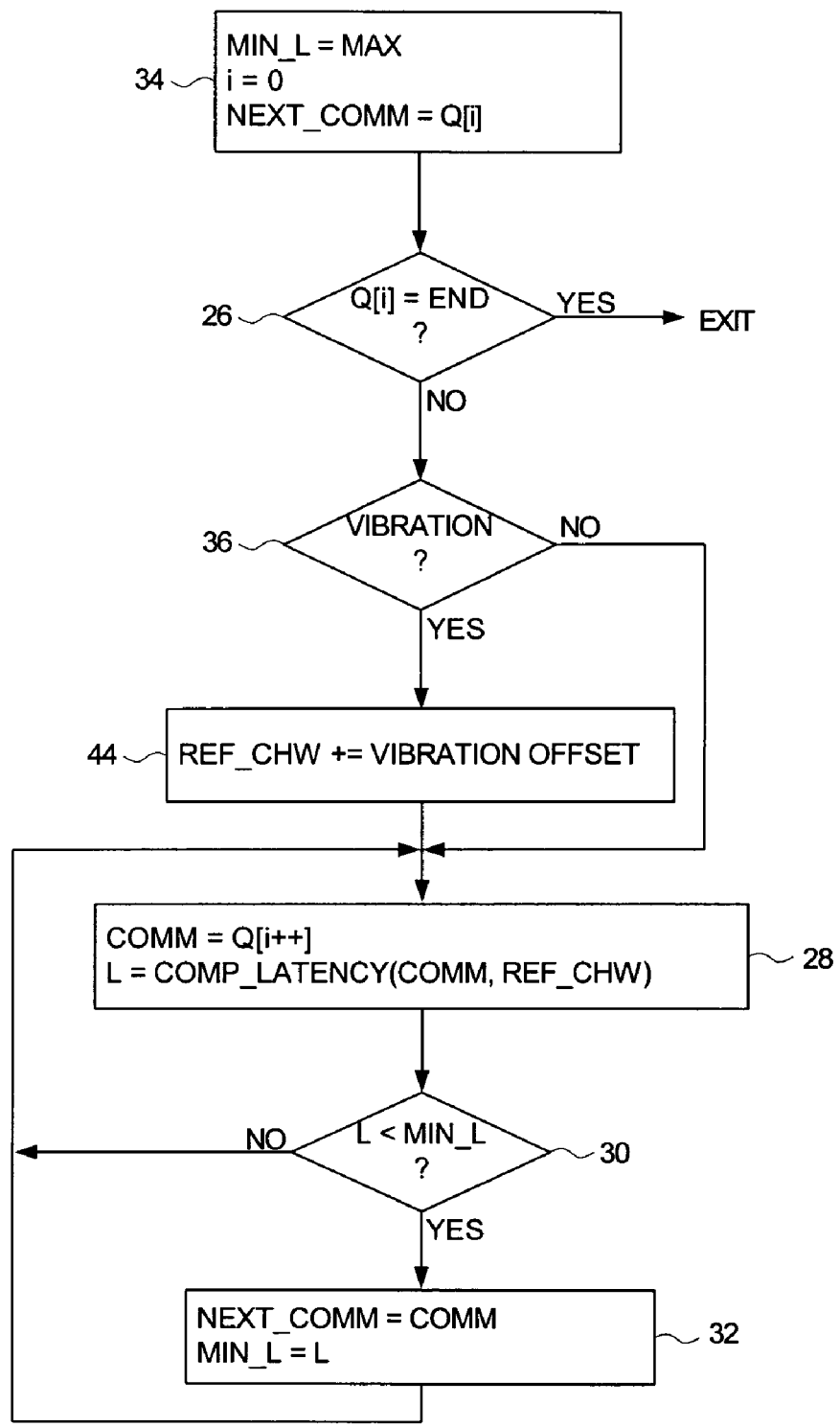
FIG. 8 shows a flow diagram according to an embodiment of the present invention wherein the estimated settle latency is increased by adjusting a reference position used to calculate the estimated access time for each command in the command queue.
Figure 9:
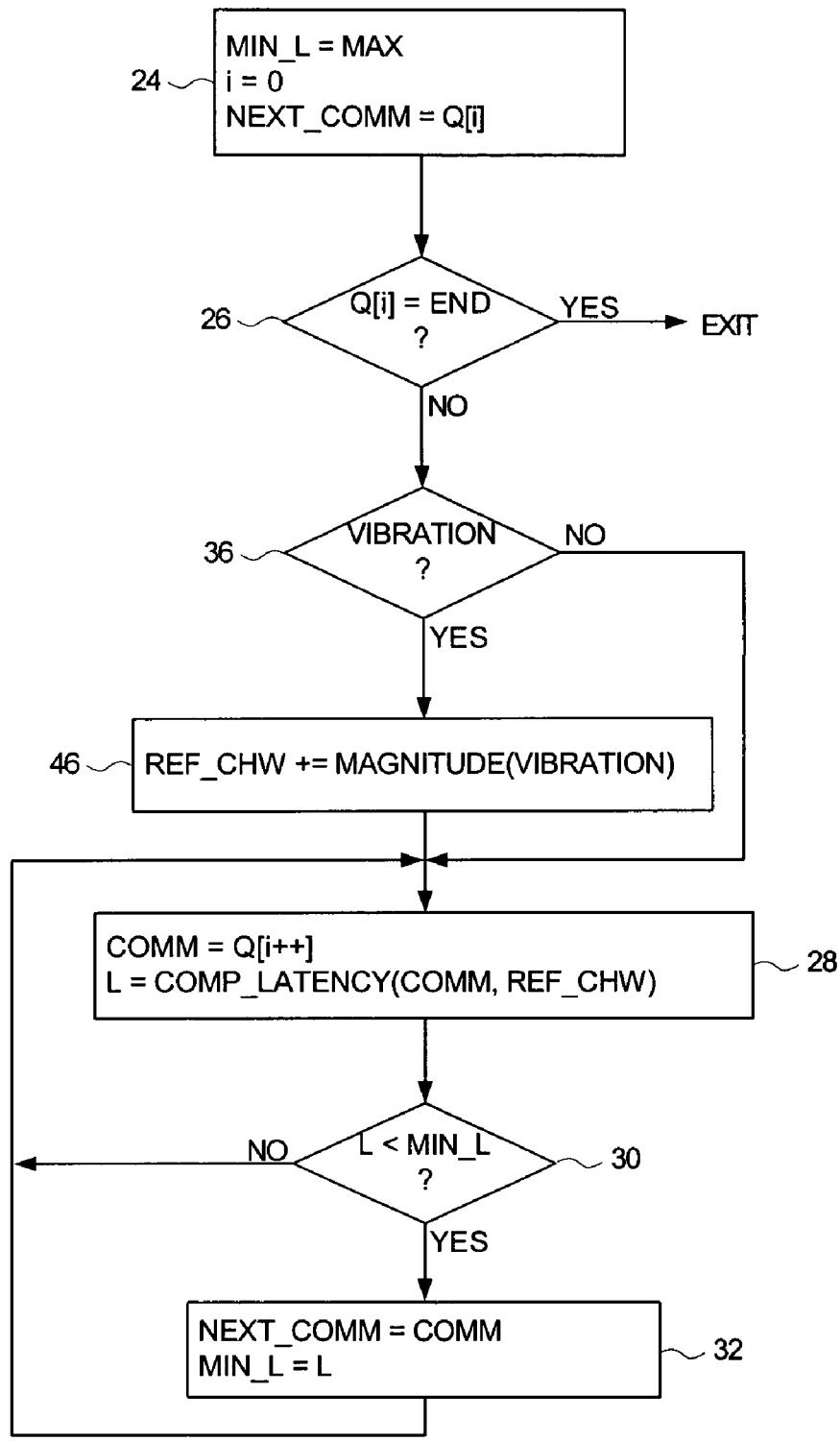
FIG. 9 shows a flow diagram according to an embodiment of the present invention wherein the reference position is adjusted as a function of the magnitude of the external vibration.

FIG. 8 is a flow diagram according to an alternative embodiment of the present invention for increasing the estimated settle latency if an external vibration is detected by adjusting the REF_CHW by an offset at step 44. Referring again to FIG. 1, increasing the REF_CHW by an offset has the same affect on the RPO algorithm as increasing the estimated settle latency. The estimated access time is then computed at step 28 in the same manner as the prior art RPO algorithm shown in FIG. 5. Adding an offset once to the REF_CHW reduces the computational latency of the RPO algorithm as compared to adding an offset to the estimated settle latency for each command in the command queue. FIG. 9 shows an alternative embodiment wherein at step 46 the REF_CHW is adjusted proportional to a magnitude of the detected external vibration.

Figure 10:
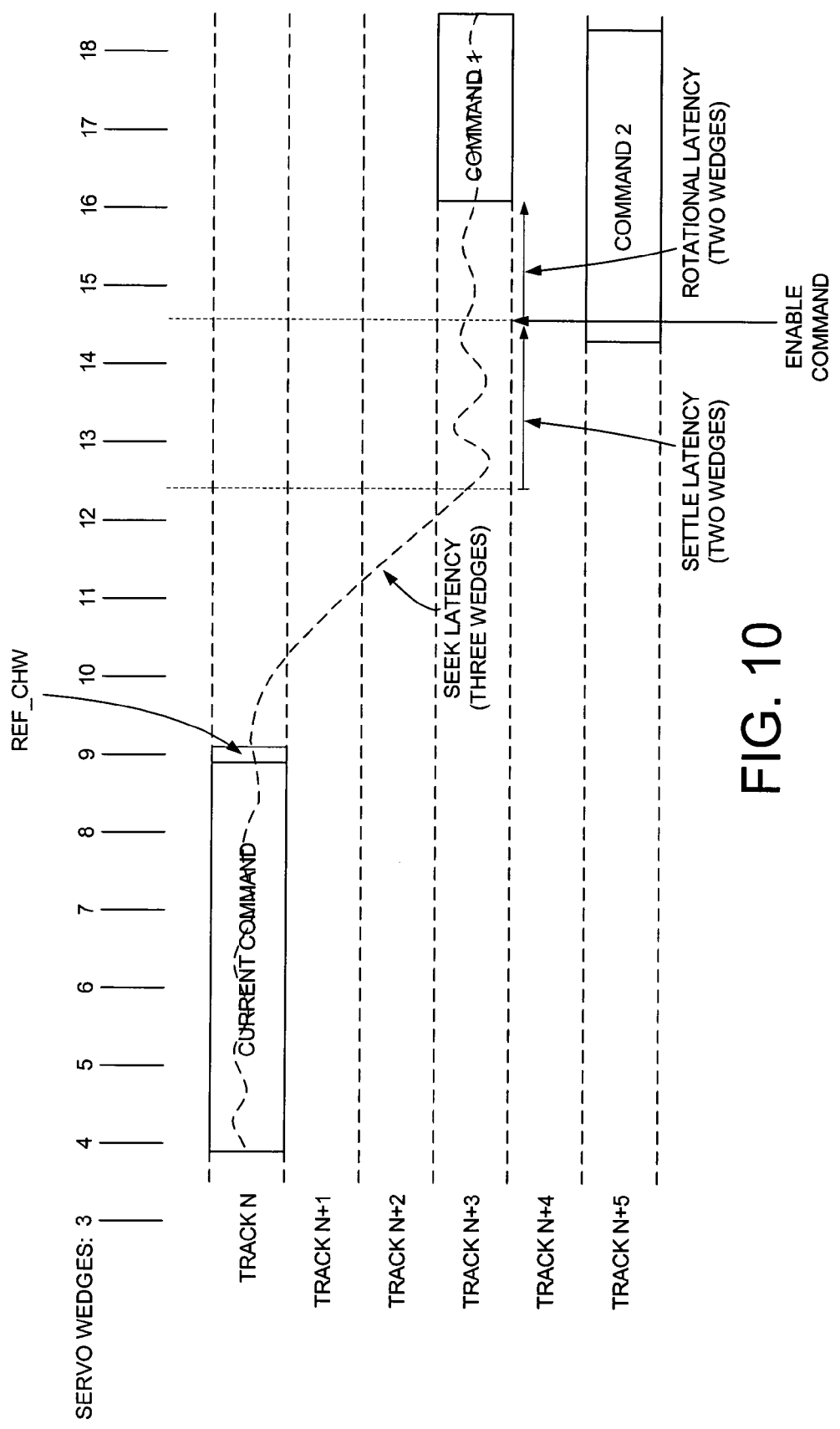
FIG. 10 shows an embodiment of the present invention wherein the estimated seek latency is increased using a different seek profile for seeking the head to the target track if the external vibration is detected.

FIG. 10 illustrates an alternative embodiment of the present invention wherein the RPO algorithm increases the estimated seek latency by using a different seek profile if the external vibration is detected. A less aggressive seek profile is used to perform the seek which increases the estimated seek latency but decreases the estimated settle latency since the head is moving slower when it arrives at the target track.

Figure 11:
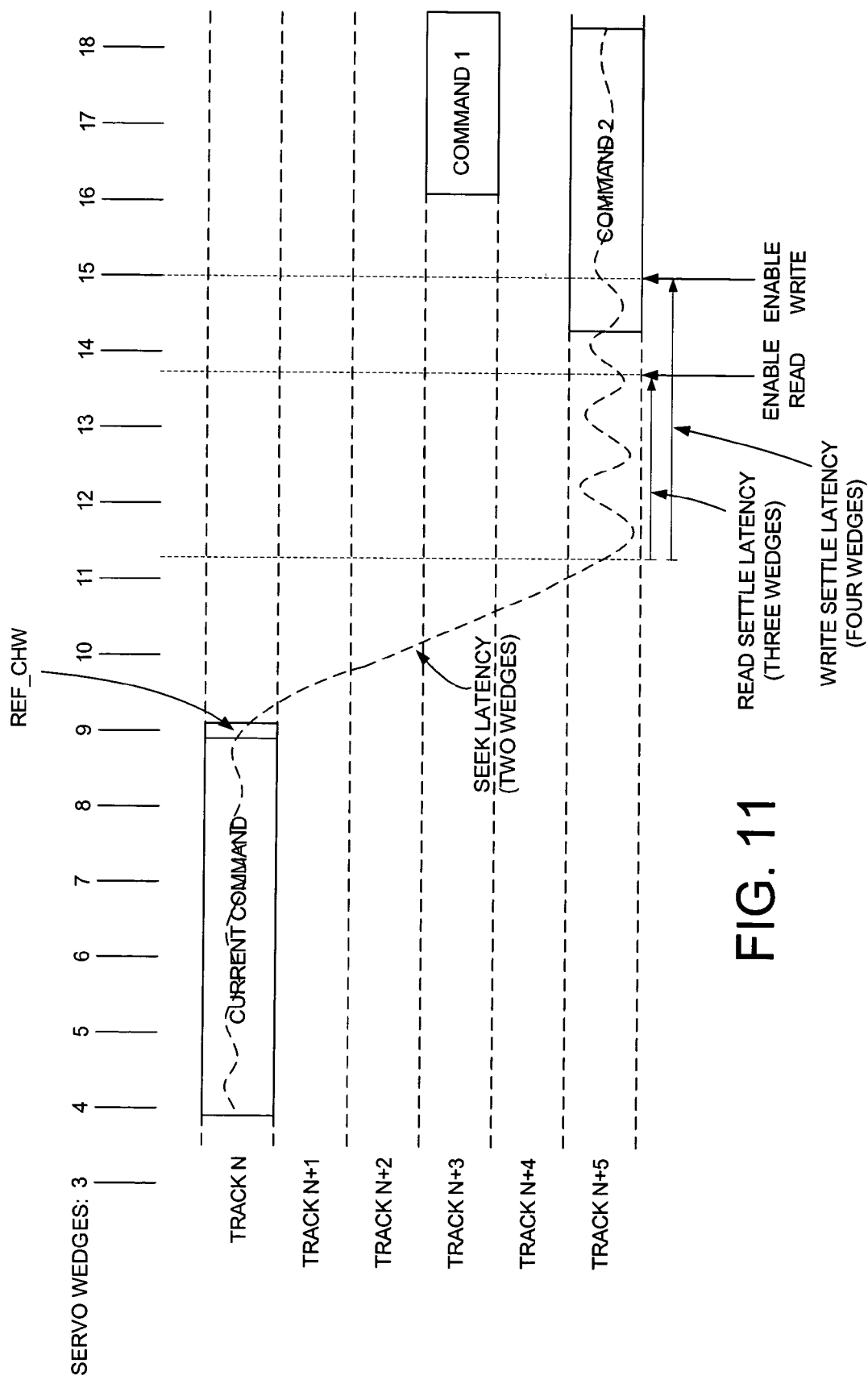
FIG. 11 shows an embodiment of the present invention wherein the RPO algorithm computes a read estimated access time for read commands and a write estimated access time for write commands.
Figure 12:
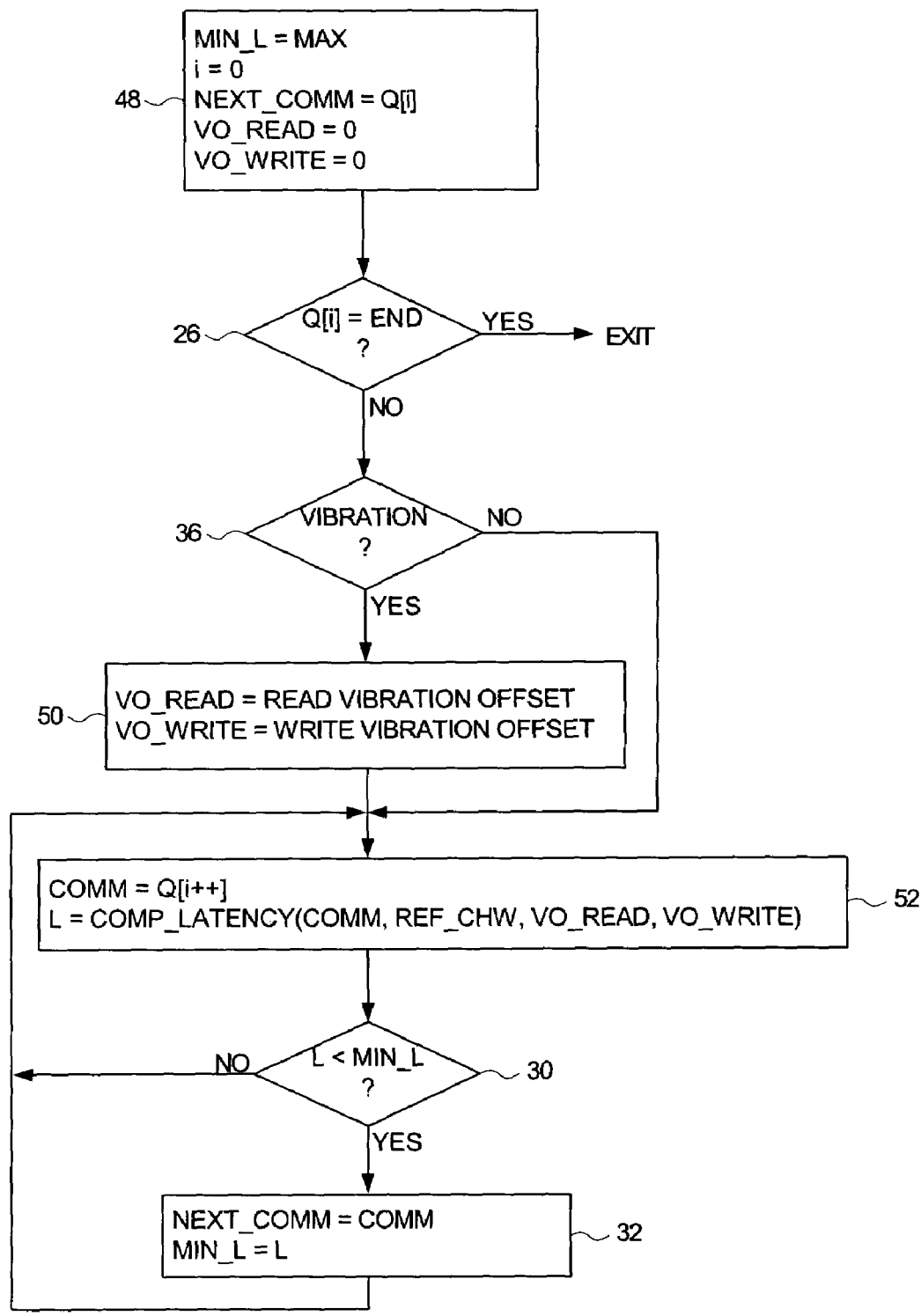
FIG. 12 shows a flow diagram according to an embodiment of the present invention wherein the RPO algorithm uses a vibration offset for read commands and a vibration offset for write commands to compute the estimated access time for each command in the command queue.

FIG. 11 illustrates an embodiment of the present invention wherein a read estimated access time is computed for read commands in the command queue and a write estimated access time is computed for write commands in the command queue. In general a read command can be enabled earlier during the settle interval since read errors do not corrupt adjacent tracks and are readily detectable. If a read error occurs, the read command is simply retried. Thus as shown in FIG. 11, the read estimated settle latency is shorter than the write estimated settle latency. Referring to the flow diagram of FIG. 12, at step 48 a VO_READ and VO_WRITE variable are initialized to zero and at step 50 a read vibration offset is assigned to VO_READ and a write vibration offset is assigned to VO_WRITE, wherein the read vibration offset is less than the write vibration offset. At step 52 an estimated access time L is computed for each read command in the command queue using VO_READ, and for each write command in the command queue using VO_WRITE.

We claim:

1. A disk drive comprising:
   (a) a disk comprising a plurality of tracks;
   (b) a head actuated radially over the disk;
   (c) a command queue for storing a plurality of commands pending execution; and
   (d) a disk controller for executing a rotational position optimization (RPO) algorithm to select a next command to execute from the command queue relative to an estimated access time comprising:
   an estimated seek latency required to move the head radially over the disk to a target track comprising the next command;
   an estimated settle latency required for the head to settle over the target track, wherein the settle latency occurs after the seek latency; and an estimated rotational latency required for the disk to rotate until the head reaches the next command, wherein the rotational latency occurs after the settle latency, wherein the RPO algorithm increases at least one of the estimated seek latency, the estimated settle latency, and the estimated rotational latency for each command in the command queue if an external vibration is detected.

2. The disk drive as recited in claim 1, wherein the next command is a read command.

3. The disk drive as recited in claim 1, wherein the next command is a write command.

4. The disk drive as recited in claim 1, further comprising an accelerometer for detecting the external vibration.

5. The disk drive as recited in claim 1, wherein the external vibration is detected from a position error signal generated by reading embedded servo sectors recorded on the disk.

6. The disk drive as recited in claim 1, wherein the external vibration is detected if a number of missed commands out of a number of attempted commands exceeds a predetermined threshold.

7. The disk drive as recited in claim 1, further comprising a voice coil motor for actuating the head radially over the disk, wherein the external vibration is detected from a back EMF voltage generated by the voice coil motor.

8. The disk drive as recited in claim 1, wherein the RPO algorithm increases the estimated settle latency if the external vibration is detected.

9. The disk drive as recited in claim 8, wherein:
(a) the estimated access time comprises an estimated seek latency value, an estimated settle latency value, and an estimated rotational latency value; and
(b) an offset is added to the estimated settle latency value if the external vibration is detected.

10. The disk drive as recited in claim 9, wherein the offset is computed in response to a magnitude of the external vibration.

11. The disk drive as recited in claim 8, wherein:
(a) the estimated access time comprises an estimated seek latency value including the estimated settle latency, and an estimated rotational latency value; and
(b) an offset is added to the estimated seek latency value if the external vibration is detected.

12. The disk drive as recited in claim 1, wherein:
(a) the estimated access time is computed from a reference position on the disk to a beginning of each command in the command queue; and
(b) the reference position is adjusted by an offset if the external vibration is detected.

13. The disk drive as recited in claim 11, wherein:
(a) the estimated access time comprises an estimated seek latency value and an estimated rotational latency value;
(b) the estimated rotational latency value includes the estimated settle latency; and
(c) adjusting the reference position by the offset increases the estimated settle latency.

14. The disk drive as recited in claim 12, wherein the reference position is adjusted by a first offset for read commands in the command queue and by a second offset for write commands in the command queue.

15. The disk drive as recited in claim 1, wherein the at least one of the estimated seek latency, the estimated settle latency, and the estimated rotational latency is increased in response to a magnitude of the detected external vibration.

16. The disk drive as recited in claim 12, wherein the offset is computed in response to a magnitude of the detected external vibration.

17. The disk drive as recited in claim 1, wherein the RPO algorithm increases the estimated seek latency if the external vibration is detected.

18. The disk drive as recited in claim 17, wherein the RPO algorithm computes the estimated seek latency from a first seek profile if the external vibration is not detected, and from a second seek profile if the external vibration is detected.

19. The disk drive as recited in claim 1, wherein the RPO algorithm increases the estimated rotational latency if the external vibration is detected.

20. The disk drive as recited in claim 19, wherein the RPO algorithm increases the estimated rotational latency by a partial revolution of the disk for at least one command in the command queue if the external vibration is detected.

21. The disk drive as recited in claim 1, wherein:
(a) the disk controller computes a read estimated access time for read commands in the command queue and a write estimated access time for write commands in the command queue; and
(b) the read estimated access time is shorter than the write estimated access time.

22. A method of operating a disk drive, the disk drive comprising a disk having a plurality of tracks, a head actuated radially over the disk, and a command queue for storing a plurality of commands pending execution, the method comprising the steps of:
(a) executing a rotational position optimization (RPO) algorithm to select a next command to execute from the command queue relative to an estimated access time comprising:
an estimated seek latency required to move the head radially over the disk to a target track comprising the next command;
an estimated settle latency required for the head to settle over the target track, wherein the settle latency occurs after the seek latency; and
an estimated rotational latency required for the disk to rotate until the head reaches the next command, wherein the rotational latency occurs after the settle latency,
(b) detecting an external vibration; and
(c) increasing at least one of the estimated seek latency, the estimated settle latency, and the estimated rotational latency for each command in the command queue in response to the detected external vibration.

23. The method as recited in claim 22, wherein the next command is a read command.

24. The method as recited in claim 22, wherein the next command is a write command.

25. The method as recited in claim 22, wherein the disk drive further comprises an accelerometer and the step of detecting the external vibration comprises the step of processing an output of the accelerometer.

26. The method as recited in claim 22, wherein the step of detecting the external vibration comprises the step of processing a position error signal generated by reading embedded servo sectors recorded on the disk.

27. The method as recited in claim 22, wherein the step of detecting the external vibration comprises the step of comparing a number of missed commands out of a number of attempted commands to a predetermined threshold.

28. The method as recited in claim 22, wherein the disk drive further comprises a voice coil motor for actuating the head radially over the disk and the step of detecting the external vibration comprises the step of processing a back EMF voltage generated by the voice coil motor.

29. The method as recited in claim 22, wherein the estimated settle latency is increased if the external vibration is detected.

30. The method as recited in claim 29, wherein:
   (a) the estimated access time comprises an estimated seek latency value, an estimated settle latency value, and an estimated rotational latency value; and
   (b) the step of an increasing the estimated settle latency comprises the step of adding an offset to the estimated settle latency value if the external vibration is detected.

31. The method as recited in claim 30, wherein the offset is computed in response to a magnitude of the external vibration.

32. The method as recited in claim 29, wherein:
   (a) the estimated access time comprises an estimated seek latency value including the estimated settle latency, and an estimated rotational latency value; and
   (b) the step of an increasing the estimated settle latency comprises the step of adding an offset to the estimated seek latency value if the external vibration is detected.

33. The method as recited in claim 22, wherein:
   (a) estimated access time is computed from a reference position on the disk to a beginning of each command in the command queue; and
   (b) the step of an increasing the estimated settle latency comprises the step of adjusting the reference position by an offset if the external vibration is detected.

34. The method as recited in claim 33, wherein:
   (a) the estimated access time comprises an estimated seek latency value and an estimated rotational latency value;
   (b) the estimated rotational latency value includes the estimated settle latency; and
   (c) adjusting the reference position by the offset increases the estimated settle latency.

35. The method as recited in claim 33, wherein the offset is computed in response to a magnitude of the detected external vibration.

36. The method as recited in claim 33, wherein the reference position is adjusted by a first offset for read commands in the command queue and by a second offset for write commands in the command queue.

37. The method as recited in claim 22, wherein the at least one of the estimated seek latency, the estimated settle latency, and the estimated rotational latency is increased in response to a magnitude of the detected external vibration.

38. The method as recited in claim 22, wherein the estimated seek latency is increased if the external vibration is detected.

39. The method as recited in claim 38, wherein the estimated seek latency is computed from a first seek profile if the external vibration is not detected and the estimated seek latency is computed from a second seek profile if the external vibration is detected.

40. The method as recited in claim 22, wherein the estimated rotational latency is increased if the external vibration is detected.

41. The method as recited in claim 40, wherein the estimated rotational latency is increased by a partial revolution of the disk for at least one command in the command queue if the external vibration is detected.

42. The method as recited in claim 22, further comprising the steps of computing a read estimated access time for read commands in the command queue and a write estimated access time for write commands in the command queue, wherein the read estimated access time is shorter than the write estimated access time.

* * * * *